United States Patent [19]
Bimba

[11] 3,811,367
[45] May 21, 1974

[54] FLUID POWER CYLINDER CONSTRUCTION
[76] Inventor: Charles W. Bimba, 101 Main St., Crete, Ill. 60449
[22] Filed: May 1, 1972
[21] Appl. No.: 249,346

[52] U.S. Cl............. 92/165, 29/156.5 R, 29/516, 29/509, 92/169, 287/20.3
[51] Int. Cl........................................... F16j 15/18
[58] Field of Search............... 29/156.5, 509, 516; 92/165, 169; 287/20.3, 20.5

[56] References Cited
UNITED STATES PATENTS
| | | | |
|---|---|---|---|
| 2,010,569 | 8/1935 | Sitzler | 29/520 |
| 2,312,989 | 3/1943 | Lavarack | 287/20.3 |
| 2,429,293 | 10/1947 | Peck et al. | 287/20.3 X |
| 2,957,734 | 10/1960 | McLeod | 220/67 |
| 3,334,773 | 8/1967 | Bimba | 220/39 |
| 3,518,920 | 7/1970 | Bimba | 92/165 R X |

Primary Examiner—Charles W. Lanham
Assistant Examiner—V. A. Dipalma
Attorney, Agent, or Firm—Philip T. Liggett

[57] ABSTRACT

A non-loosening, high pressure resistant system for connecting an end cap member of a fluid power cylinder to the tubular body section by providing a special flat-bottomed and sloping wall groove in the periphery of each end cap and then rolling the end portion of the tubular body section down into the groove to make an assembled connection. The rolled end of the body section is subsequently locked into the groove of the end cap to provide longitudinal strength by rolling a narrow shoulder portion of the end cap down thereover, while still further circumferential and longitudinal strength is provided by having a press-fit band encompass the rolled and engaged portions of the tubular body section and the end cap.

2 Claims, 5 Drawing Figures

FLUID POWER CYLINDER CONSTRUCTION

The present invention relates to an improved system for constructing fluid power cylinders such that the resulting connections between the tubular body section and the end caps provide both longitudinal and circumferential strength. In a more specific aspect, the invention provides the combination of an improved peripheral groove in each cap and a rolled-in end portion for the tubular body section, as well as a press-fit band to encompass the rolled and engaged portions of the body section and the end cap.

There have been constructions for fluid power cylinders where an end portion of the tubular body section is rolled into a groove around the end cap; however, such groove means have generally been of a V-shape and have not had both a continuous ring of overlapping metal from the end cap itself and a reinforcing, separate press-fit ring to provide a tight locking arrangement. In connection with air cylinders, the maximum air pressure is usually about 250 psig and the simple rolled-in engagements are satisfactory; however, for hydraulic cylinders, where the operating pressures are of the order of 1,000 psig then better locking and pressure holding engagements are necessary to provide a suitable safety factor.

Thus, it may be considered a principal object of the present invention to provide an improved form of flat-bottomed and sloping-sided groove in an end cap of a fluid power cylinder for having a locked-in rolled end portion of the tubular body section, along with a separate press-fit encompassing band whereby to effect a resulting tight joining of the sections of the power cylinder unit, particularly resistant against longitudinal hydraulic forces.

It is a still further object of the present invention to provide for a press-fit of the end of the tubular body section over the inserted end portion of an end cap section so as to in turn provide a resulting slight enlargement of the exterior of the tubular body section at the engagement zone and inside of the separate press-fit, encircling tie band.

In one embodiment, the present invention provides a fluid power cylinder having a tubular body section, metallic end caps, an internal piston member and piston rod means extending through at least one of the end caps, the improved method of providing a non-loosening connection between an end cap and the tubular body section, which comprises the steps of; providing an extended width peripheral portion for the end cap sized to fit into an end of the tubular body section; forming a continuous peripheral shoulder around said end cap which is of larger diameter than said extended width portion adapted to engage said body section and which will form an abutting stop for the latter when they are assembled; further forming a peripheral flat-bottomed groove in said cap adjacent said shoulder, with said groove bottom being of lesser diameter than said extended width portion of the cap and said groove further having a sloping wall portion angled upwardly toward such extended width portion; effecting a coupling between the end cap and said tubular body section to a point where the end of the latter abutts said shoulder of said cap and then rolling and permanently deforming the end of the body section down into said flat-bottomed groove until the body section conforms to the bottom and sloping wall portion of such groove; subsequently rolling and wedging a portion of the shoulder of said cap continuously down over said deformed end portion of the tubular body section in said groove, whereby there is an initial tight peripheral clamping of the end cap to the body section, and further pressing a tight fitting encircling metal tie band over the rolled and engaged portions of the end of the tubular body section and the end cap, whereby there is a high pressure resisting engagement.

In another embodiment the present invention provides a fluid power cylinder having a tubular body section, metal end caps, an internal piston member, and piston rod means extending from the piston through at least one of the end caps, the improved non-loosening, high pressure resistant connection between an end cap and the tubular body section which comprises; having an extended width peripheral portion of the cap to be slip-fit into and engage an end portion of the tubular body section; providing a deformed and depressed end of the tubular body section to be bent and formed down into a flat-bottomed groove in said cap which has a smaller diameter than said engaged portion for said end cap; having a rolled and deformed continuous ring of metal from said external periphery of said end cap overlap the depressed end of the tubular body section to thereby effect a tight longitudinal clamping and fluid seal between the latter and the end cap, and further providing a press-fit tie band around the rolled and engaged portions of the end cap and the deformed end of the tubular body section, whereby there is a tight holding of such engagement to withstand higher pressure and torque stresses on the cylinder.

As noted in the foregoing embodiments, it is a particular feature of the invention to provide for a specially formed groove within an end cap section such that there is at least a small flat portion within the bottom of the groove and, in addition, a sloping wall portion for the end of tubular body section such that a peripheral portion of shoulder from the end cap may overlap a resulting flattened end portion of the tubular body section and provide the initial clamping between the parts. Also, preferably, the rolling of the shoulder portion of the end cap will be such as to have an external circumference about equal to the exterior of the body cylinder such that the encompassing tie band will be a tight fit over body portions in its final fixed position.

Generally, the groove in the end cap section will be cut by a suitable cutting tool in a manner to leave a resulting small flat bottom portion extending circumferentially alongside of a straight shoulder part of the end cap, as well as having a sloping wall section. Thus, subsequently, the rolling of the end portion of the tubular body section will, in turn, provide a small flat end piece and a resulting sloping transition piece from the bottom of the groove up toward the main body portion of the cylindrical body section. A suitable disc member capable of rolling around an assembled end cap portion and the tubular body section, or alternatively, the means for moving an assembled fluid power cylinder with respect to a fixed position rolling disc member, will provide for the tight rolling of the end portion of the tubular body section down into the groove so as to bring about a resulting conformity of the latter with such groove. In addition, a suitable disc member will generally be used to provide for the cutting and the rolling of a portion of the shoulder of the end cap section so that it will be deformed to have a circumferential lip that laps down over the flattened end portion of the tubular body section and at least a part of the sloping wall transition section. This rolled and lapped construction will assist in providing a resulting leak-proof, pressure-tight assembly between the tubular body section and the end cap members, with the added factor of a high degree of longitudinal strength.

At the same time, as part of the overall assembly system of the present invention, there is provided a reinforcing tie band which is pressfit over the rolled and engaged portions of the body section and the end cap. In order not to require an off-set ring or two-dimensional band, the preferred construction has the rolled shoulder part of the cap be finished to have an external diameter about the same as the cylindrical body section O.D. at the connection, such that the reinforcing ring will be press-fit over both the end of the body section and the rolled-down shoulder portion on the end cap.

Reference to the accompanying drawings and the following description thereof will serve to show the means for effecting the joining of a tubular body section and an end cap member so as to effect both a longitudinally and circumferentially strong assembly for a fluid power cylinder.

Figure 1:
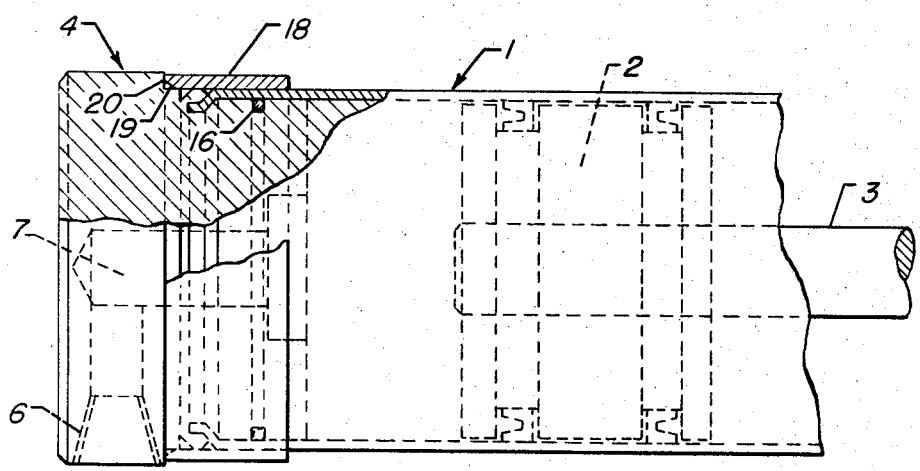
FIG. 1 of the drawing is an elevational view, partially in section, of the improved pressure resistant assembly between the tubular body section and an end cap section for a fluid power cylinder.

Referring now particularly to FIG. 1 there is indicated a typical fluid power cylinder in that it has a tubular body portion 1 adapted to accommodate an internal piston member 2 and connecting rod 3, with the latter adapted to extend through an opposing end cap section now shown. At the end portion of the cylinder illustrated, there is provided an end cap member 4 that has an extended width peripheral portion 5 adapted to be a tight press fit within the end portion of the tubular body section 1. There is also indicated diagrammatically a fluid port 6 connecting with passageway means 7 which in turn connects with the interior of the fluid cylinder so as to provide fluid pressure to the fluid piston member 2.

Figure 2:
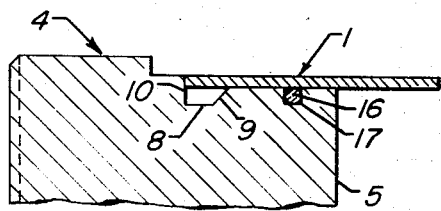
FIGS. 2, 3 and 4 indicate diagrammatically the improved method of effecting the rolled connection between the end of a tubular body section and a grooved end cap section for a fluid power cylinder assembly in accordance with the present improved system.
Figure 3:
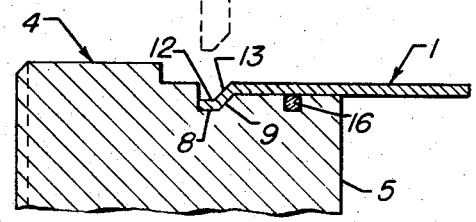
Figure 4:
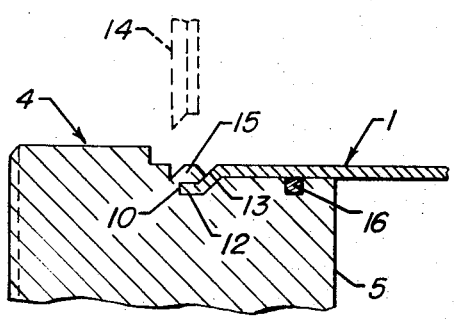

As best shown in the enlarged FIGS. 2, 3 and 4, in order to effect the assembly of the end cap 4 with the body section 1, in accordance with a part of the present improved system, there is provided a groove in the cap member 4 with a flat-bottom 8 and a sloping wall portion 9. The groove is also formed to have a straight wall shoulder portion 10 in order that the end of the tubular body section 1 may be initially assembled to abut tightly against such straight wall shoulder portion 10. As a means of carrying out the improved assembly of the unit under the method of the present invention, after the end cap 4 has been inserted into the end of the cylindrical or tubular body section 1, as shown in FIG. 2, there is then effected an inward rolling and deformation of the end of the body section 1. Generally the deformation will be by a roller member, which is here indicated by the dashed line 11, so that there will be enough pressure to cause the end portion of cylinder 1 to in turn have a shape conforming with that of the groove in the end cap member 4. In other words, there will be a small flat end portion 12 pressured inwardly to rest against the flat-bottom portion 8 while, at the same time, there will be a sloping wall portion 13 rolled tightly against the sloping groove portion 9 for the end cap 4.

In a subsequent operation, as best shown by FIG. 4, a roller member, such as indicated by the dashed lines 14, will be utilized to cut into or bear inwardly against a peripheral portion of end cap 4 at a distance spaced slightly away from the vertical shoulder line 10 such that a portion of the latter will be deformed or rolled into a lip-like member 15 that covers over the short flat end portion 12 and a part of the sloping wall portion 13 of the rolled end portion of cylindrical body section 1. By this operation there is a completely sealed assembly of the end cap 4 with the tubular body section 1. In order to provide additional seal means there is also shown the use of an "O" ring 16 in a groove means 17 extending circumferentially around the inserted part of the end cap 4. Thus, as the end of the cylinder 1 is pressed over the end cap 4, there is a tight seal with the "O" ring 16.

Figure 5:
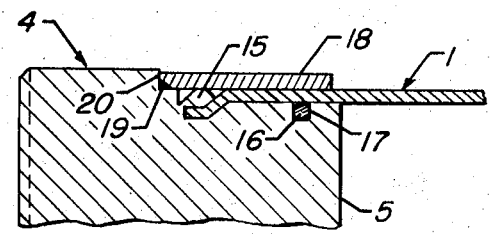
FIG. 5 indicates diagrammatically the placement of the encircling metal reinforcing ring over the rolled-in and engaged portions of the assembly.

In accordance with the present invention, a still further assembly step is effected to preclude any blow-out of the end cap 4 or any circumferential turning of the assembled members. Such step includes the addition of the reinforcing tie band 18 around the grooved and rolled-in portions of the engaged end cap and tubular body section. With particular reference to FIG. 5 of the drawing, there is indicated the use of a wide band 18 extending over the O.D. of the body section 1 and the rolled lip-like portion 15. Preferably, the O.D. of the latter will be about the same as the O.D. of the cylindrical body portion 1, such that the I.D. of the circular band 18 will be tight against both sections as it is press-fit over the initial assembly. It will also be noted that the external interior edge portion of the ring or band 18 is chamfered at 19 to assist in the press-fitting operation. In the actual assembly, the bands 18 are slipped over the tubing 1 prior to pressing the tubing over the end caps and then afterwards there is a slight enlargement of the tubing of perhaps by 0.01 inch ± in outside diameter. The rolling of the end cap shoulder to form lip 15 is also carried out to substantially match the O.D. of the tubing and permit the I.D. of the band 18 to be a tight press-fit over the assembly of the wall 1 and the end cap at 15. Preferably a shoulder 20 is provided around end cap 4 to, in turn, provide a suitable stop for the band 18 being pressed around the assembled parts.

Typically, the reinforcing band 18 will be fabricated of cold-rolled steel to provide suitable tensile strength to, in turn, result in a desired pressure resistant fluid power cylinder which can be capable of withstanding pressures up to at least about 4,200 psig, before having a breakage of the end cap from the tubular body member. In most of the commonly used cylinders, the body cylinder is of stainless steel tubing material and the end caps are of aluminum, or other material softer than the body portion 1; however, it is not intended to limit the present improved assembly construction to any preset types of materials for the cylinder, end-caps or tie band members.

I claim as my invention:

1. In a fluid power cylinder having a tubular body section, metal end caps, an internal piston member, and piston rod means extending from the piston through at least one of the end caps, the improved non-loosening high pressure resistant connection between an end cap and the tubular body section which comprises:

a. having an extended width peripheral portion of the cap slip-fit into and engaging an end portion of the tubular body section,
   b. having a deformed and depressed end of the tubular body section bent and deformed down into a flat-bottomed groove in said cap which has a smaller diameter than said engaged portion for said end cap,
   c. having a rolled and deformed continuous ring of metal from said external periphery of said end cap overlap said depressed end of the tubular body section to thereby effect a tight longitudinal clamping and fluid seal between the latter and the end cap, and
   d. further having a press-fit band around the rolled and engaged portions of the end cap and the deformed end of the tubular body section, whereby there is a tight holding of such engagement to withstand higher pressure and torque stresses on the cylinder.

2. The power cylinder of claim 1 further characterized in that said end cap is provided with a shoulder to effect an abutting stop for said press-fit ring and the latter has a chamfer around one internal peripheral edge to assist in the assembly of said ring over said tubular body section and over the deformed ring of metal from the end cap.

* * * * *